June 4, 1957  R. S. HILL  2,794,290
CARRIER FOR FLY OR LIKE FISHING CASTS
Filed May 7, 1956

Inventor
Roland Sydney Hill

By
*[signature]*
Attorney

2,794,290
CARRIER FOR FLY OR LIKE FISHING CASTS

Roland Sydney Hill, Bridge of Allan, Scotland

Application May 7, 1956, Serial No. 583,238

Claims priority, application Great Britain March 27, 1952

4 Claims. (Cl. 43—57.5)

The present invention relates to carriers for fly or like fishing casts of the kind including a plurality of spaced flies or the like, for example a bob fly, a tail fly, and several dropper flies between the bob and tail flies.

It has heretofore been proposed to provide a carrier for fly or like fishing casts which is in the form of a disc around which the cast is wound and which has peripheral retaining means engageable by the fly hooks to maintain the flies spaced around the periphery of the disc. This known construction of carrier has the disadvantage that in unwinding the cast, it is liable to become entangled due to detachment of the flies from the retaining means in the wrong sequence.

It is an object of the present invention to obviate or mitigate this disadvantage.

According to the present invention, a carrier for fly or like fishing casts of the kind referred to comprises a carrier disc around which the cast is wound, retaining means on the said carrier disc engageable by the fly or like hooks to maintain the flies or the like spaced around the disc, and a rotatable indicator adapted to be shifted angularly to indicate the position on the disc of the last fly or the like attached thereto during the winding of the cast.

One embodiment of the invention will now be described with reference to the accompanying drawings in which.

Figure 1:
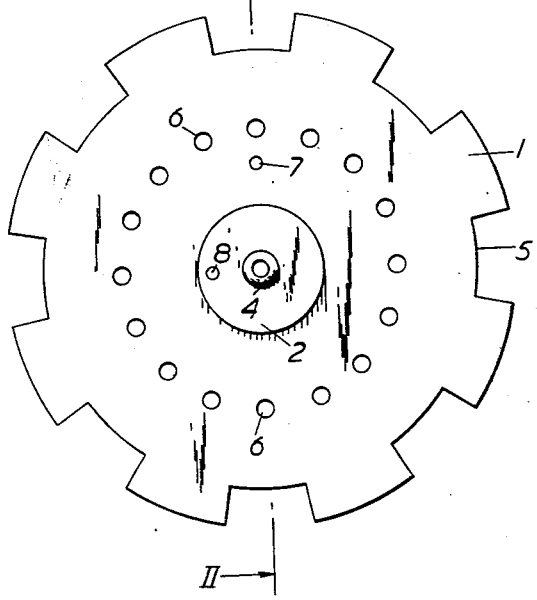
Fig. 1 is a plan view of a carrier according to the invention.
Figure 2:
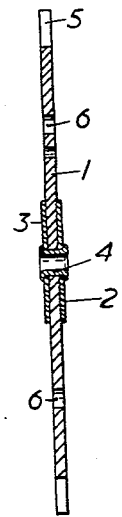
Fig. 2 is a section taken along the line II—II of Fig. 1.

As will be seen from the drawings, a carrier for a fishing cast including a bob fly, a tail fly, and several dropper flies between the bob fly and the tail fly, comprises a carrier disc 1 secured between an indicator disc 2 and a locking disc 3 upon a common rivet 4 so as to permit relative rotational movement of the carrier disc and the indicator disc for the purpose hereinafter described.

The carrier disc 1 is stamped from a suitable sheet material and the periphery is provided with spaced recesses or cut-outs 5 to form a castellated periphery upon which the cast is wound, the cast being woven between the castellations to secure it against displacement relative to the carrier disc. The carrier disc 1 is also provided with a plurality of through apertures 6 adapted to receive and releasably to retain the fly hooks, and a datum mark 7 which is in the form of a coloured dot, is applied to the carrier disc adjacent one of the hook receiving apertures 6 and serves to indicate the position of the tail fly hook on the carrier disc. A further datum mark 8 also in the form of a coloured dot is applied to the indicator disc 2 adjacent the periphery thereof and, by rotating the disc 2 relative to the carrier disc 1, the mark 8 on the indicator disc can be made to lie opposite the hook receiving aperture in which the bob fly hook is inserted. Conveniently the two datum marks 7 and 8 are differently coloured for example red and green.

In using the carrier, the tail fly of the cast is first hooked into the aperture indicated by the datum mark 7 and the cast is wound round the disc zigzagging between the castellations of the periphery thereof. Intermediate dropper flies are hooked into selected ones of the apertures 6 during the winding of the cast and finally, the bob fly is hooked into a convenient aperture 6. The indicator disc 2 is then rotated relative to the carrier disc 1 until the datum mark 8 on the disc 2 lies opposite the aperture 6 in which the bob fly hook is positioned. The last inch or two of the cast and the loop knotted thereon is wound between the carrier disc 1 and the locking disc 3 thus urging the disc 1 and 3 apart and thereby frictionally locking the three discs 1, 2 and 3 against movement relative to one another.

It will be apparent that the unwinding of the cast is greatly facilitated by the indication thus given of the position of the bob and tail flies upon the carrier disc 1 which ensures that the flies can be detached from the carrier disc in the proper sequence and thereby avoid entangling the cast.

I claim:

1. A carrier for fly or like fishing casts, comprising a carrier disc around which a cast is adapted to be wound, said carrier disc having retaining means engageable by the fly or like hooks to maintain the flies or the like spaced around the disc, and a rotatable indicator adapted to be shifted angularly to indicate the position on the disc of the last fly attached thereto during the winding of the cast.

2. A carrier according to claim 1, in which said disc is formed with a plurality of through apertures spaced around the carrier disc, the boundaries of which apertures form the retaining means for said hooks.

3. A carrier according to claim 1, in which said carrier disc is secured between a rotatable indicator disc and a locking disc upon a common axis for relative rotational movement.

4. A carrier according to claim 1, in which said carrier disc is provided with a castellated periphery upon which the cast can be wound.

References Cited in the file of this patent
FOREIGN PATENTS 744,488     Great Britain _____ Feb. 8, 1956